Patented Aug. 6, 1940

2,210,834

UNITED STATES PATENT OFFICE 2,210,834

PROCESS OF CHLORINATING ALIPHATIC ACIDS

Paul Heisel, Gersthofen, near Augsburg, and Albert Hendschel, Frankfort-on-the-Main-Hochst, Germany, assignors to I. G. Farbenindustrie Aktiengesellschaft, Frankfort-on-the-Main, Germany No Drawing. Application November 19, 1938, Serial No. 241,392. In Germany November 25, 1937

7 Claims. (Cl. 260—539)

The present invention relates to a process of chlorinating fatty acids.

Various processes are already known for chlorinating fatty acids, or the anhydrides, acid chlorides or mixtures thereof in the presence or absence of indifferent organic solvents. There has been used as chlorination catalysts agents such as active light, inorganic and organic acid chlorides, substances having an active surface, such as active alumina, active fuller's earth, or the like. These known chlorination methods, however, fail to work in the case of some acids and mixtures of acids, for instance those obtained among others from alcohols by the treatment with caustic alkali. During the processes, the chlorination temperatures applied or the addition of the catalyst causes the final products to take on a dark coloration. As the chlorinated acids cannot be purified by a distillation under reduced pressure owing to the decompositions occurring thereby, it is not possible in most cases to use the chloro-fatty acids produced.

We have now made the surprising discovery, that saturated aliphatic monocarboxylic acids or mixtures of several of these acids which chiefly consist of molecules with a branched chain, can readily be chlorinated and that the subsequent darkening of the chlorination products is avoided by causing the chlorine to act in the presence of water. As a catalyst there is used in this case a water-soluble salt of an inorganic acid containing oxygen and sulfur or mixtures of different salts of this kind, such as sodium sulfite, sodium bisulfite, sodium metabisulfite, sodium thiosulfate, sodium hydrosulfite, sodium sulfate, the corresponding potassium salts or lithium salts or the like. As temperatures to be applied for the chlorination, room temperature to at most about 80° C. to 100° C. are sufficient. The yield is increased by the repeated use of the mother liquors from former chlorination processes.

It has furthermore been found that the alkali metal salts of these acids may just as well be directly subjected to the chlorination. If the aqueous solutions of for instance the sodium salts, potassium salts or lithium salts are mixed with the catalysts named, it is possible to subject them readily to the chlorination. The hydrochloric acid which is set free during the reaction causes the carboxylic acids formed to be freed from their salts. In this case, too, products which are light in color are obtained at chlorination temperatures between 50° C. and 80° C. whereas according to former chlorination processes dark chlorination products are obtained even when these low chlorination temperatures are maintained.

The quantity of the water employed may vary within large limits. There is suitably employed as small a quantity as possible, i. e. between about the tenth part up to about the same proportion calculated upon the amount by weight of the compound to be chlorinated. The reaction mixture is suitably well mixed during the reaction, for instance by stirring it.

The quantity of the catalyst employed may likewise vary within large limits. It is already sufficient if it amounts to the tenth part of the quantity by weight of the water employed.

The mixture is caused to react, while chlorine is introduced, until the required quantity of chlorine has been taken up. Monochlorinated as well as dichlorinated products may thus be obtained.

As starting materials there may, for instance, be used the mixture of acids named in Example 1 of the present application or various components of this mixture, such as methyl-iso-butyric acid, iso-capronic acid, iso-heptylic acids, iso-octylic acids as well as aliphatic saturated monocarboxylic acids of higher molecular weight and having a branched carbon chain with up to 14 carbon atoms.

The following examples serve to illustrate the invention, but they are not intended to limit it thereto:

1. 5 kilos of a mixture of acids obtainable by oxidizing the oily reaction products (chiefly alcohols) of the catalytic hydrogenation with application of pressure of carbon-monoxide, for instance by oxidizing the alcohols by means of caustic alkalies as described in German Patent No. 441,272, are mixed with 3 kilos of a mother liquor obtained from former chlorination processes. The mother liquor contain as chief constituent the catalyst required for the chlorination in the form of sodium salts of oxygen acids of sulfur, for instance sodium meta-bisulfite. 2.6 kilos of chlorine are introduced at 65° C., while stirring. When the reaction is complete the upper layer, which is of a light yellow color and which contains the chlorinated carboxylic acids, is separated, washed with water and dried. There are obtained 5.9 kilos of monochlorocarboxylic acids containing 23.2 per cent. of chlorine.

2. 5 kilos of the mixture of carboxylic acids named in Example 1 are mixed with 3 kilos of a mother liquor obtained from a former chlorination process and 0.5 kilo of sodium hydrosulfite is added as a catalyst. 4.8 kilos of chlorine are introduced at 80° C., while stirring. After the chlorination is complete, the upper layer is separated, washed and dried. There are obtained 6.9 kilos of dichlorocarboxylic acids containing 45.5 per cent. of chlorine.

3. 3 kilos of sodium isocapronate are mixed with 2 kilos of a mother liquor obtained from a former chlorination process and 0.3 kilo of sodium hydrosulfite is added as a catalyst, 1.55 kilos of chlorine are introduced at 80° C., while stirring. After the chlorination is complete, the oily upper layer is separated, washed and dried. There are obtained 3.3 kilos of chloro-iso-capronic acid containing 23.7 per cent. of chlorine.

We claim:

1. In the process of preparing chloro-derivatives of compounds of the group consisting of saturated aliphatic monocarboxylic acids and their alkali metal salts, said compounds containing a branched carbon chain, the step which comprises causing chlorine to act upon said compounds in the presence of water and of a water-soluble salt of an inorganic acid containing oxygen and sulfur.

2. In the process of preparing chloro-derivatives of compounds of the group consisting of saturated aliphatic monocarboxylic acids and their alkali metal salts, said compounds containing a branched carbon chain, the step which comprises causing chlorine to act at temperatures between room temperature and about 100° C. upon said compounds in the presence of water and of a water-soluble salt of an inorganic acid containing oxygen and sulfur.

3. In the process of preparing chloro-derivatives of compounds of the group consisting of a mixture of saturated aliphatic monocarboxylic acids and their alkali metal salts, said compounds being obtainable by oxidizing the oily reaction products of the catalytic hydrogenation with application of pressure of carbon monoxide the step which comprises causing chlorine to act upon said compounds in the presence of water and of a water-soluble salt of an inorganic acid containing oxygen and sulfur.

4. In the process of preparing chloro-derivatives of compounds of the group consisting of a mixture of saturated aliphatic monocarboxylic acids and their alkali metal salts, said compounds being obtainable by oxidizing the oily reaction products of the catalytic hydrogenation with application of pressure of carbon monoxide the step which comprises causing chlorine to act at temperatures between room temperature and about 100° C. upon said compounds in the presence of water and of a water-soluble salt of an inorganic acid containing oxygen and sulfur.

5. In the process of preparing chloro-derivatives of compounds of the group consisting of a mixture of saturated aliphatic monocarboxylic acids and their alkali metal salts, said compounds being obtainable by oxidizing the oily reaction products of the catalytic hydrogenation with application of pressure of carbon monoxide the step which comprises causing chlorine to act upon said compounds in the presence of water and of an alkali metal meta-bisulfite.

6. In the process of preparing chloro-derivatives of compounds of the group consisting of a mixture of saturated aliphatic monocarboxylic acids and their alkali metal salts, said compounds being obtainable by oxidizing the oily reaction products of the catalytic hydrogenation with application of pressure of carbon monoxide the step which comprises causing chlorine to act upon said compounds in the presence of water and of an alkali metal hydrosulfite.

7. In the process of preparing chloro-derivatives of an alkali metal salt of isocapronic acid the step which comprises causing chlorine to act upon said compounds in the presence of water and of an alkali metal hydrosulfite.

PAUL HEISEL.
ALBERT HENDSCHEL.